United States Patent [19]

Davis et al.

[11] Patent Number: 4,800,124

[45] Date of Patent: Jan. 24, 1989

[54] SILCONE ELASTOMER-FORMING COMPOSITIONS

[75] Inventors: James H. Davis, Sully; Michael J. Dams, Cardiff, both of Wales

[73] Assignee: Dow Corning, Ltd., Barry, Wales

[21] Appl. No.: 66,381

[22] Filed: Jun. 25, 1987

[30] Foreign Application Priority Data

Jul. 10, 1986 [GB] United Kingdom ............ 863616857

[51] Int. Cl.$^4$ .......................... B32B 9/00; C08K 3/34; C08G 77/04
[52] U.S. Cl. .................................. 428/391; 428/447; 524/449; 524/588; 524/860; 524/268; 525/477; 525/474; 528/24; 528/32
[58] Field of Search ................... 525/477, 479, 474; 524/449, 588, 860, 268; 428/391, 447; 528/32, 24

[56] References Cited

U.S. PATENT DOCUMENTS 3,772,239 11/1973 Burns .................................. 528/32
4,269,757 5/1981 Mine et al. ......................... 524/588

FOREIGN PATENT DOCUMENTS 0016758 2/1978 Japan .................................. 524/449
1097629 12/1965 United Kingdom .
1551475 8/1979 United Kingdom .
2046771 11/1980 United Kingdom .

*Primary Examiner*—John C. Bleutge
*Assistant Examiner*—R. Dean, Jr.
*Attorney, Agent, or Firm*—Edward C. Elliott

[57] ABSTRACT

A composition which is curable to an elastomer comprising (1) a siloxane gum having a Williams plasticity of at least 100 mm/100 at 25° C., (2) a reinforcing silica filler, (3) a copolymer of $R_3SiO_{0.5}$ units and $SiO_2$ units in which R represent a monovalent hydrocarbon group having less than 7 carbon atoms, (4) mica and (5) an organic peroxide curing agent.

The compositions are useful for providing fire resistant insulation on electrical equipment.

6 Claims, No Drawings

SILICONE ELASTOMER-FORMING COMPOSITIONS

This invention relates to silicone elastomer-forming compositions.

The use of silicone rubbers for insulating electrical equipment has been known and widely practised for many years. In particular, silicone elastomers have been extensively employed to provide an insulating sheath on electric wires and cables. The heat resistance of such elastomers makes them especially suitable for use when the cable or wire has to operate under conditions involving high temperatures. A further advantage of silicone elastomers lies in their property of forming a non-conductive ash on combustion. It is thus possible for the wire or cable to function to some extent during or following exposure to fire. The residual ash is, however, mechanically weak. Although various proposals have been made for producing flame-resistant cables, see for example British Patent Specifications Nos. 1 097 629 and 1 551 475, there has remained a need for electrical insulation which has improved retention of mechanical and electrical properties under conditions involving exposure to high temperatures (e.g. 500°–1000° C.) which may also involve exposure to fire.

In G.B. Patent Application 2 046 771A there are disclosed compositions comprising (a) 100 parts by weight of a siloxane copolymer comprising $R_3SiO_{0.5}$ and $SiO_2$ units, in which R is a substituted or unsubstituted monovalent hydrocarbon radical having 1 to 10 carbon atoms; (b) 0 to 600 parts by weight of an organopolysiloxane polymer having the average unit formula $RaSiO_{4-a/2}$ and containing no $SiO_{4/2}$ units, wherein R has the value ascribed in (a) and a has an average value of 1 to 3; (c) 3 to 500 parts by weight of a ceramic-forming filler: and (d) 0.1 to 10 parts by weight of organic peroxide.

The said patent application also discloses the use of the compositions as coating materials for fire resistant electric wires and cables.

According to the present invention there is provided a composition curable to a siloxane elastomer which comprises (1) a polydiorganosiloxane gum wherein at least 50 percent of the total organic substituents are methyl groups, up to 2.5 percent of the total substituents are vinyl groups and any remaining substituents are selected from phenyl and 3,3,3-trifluoropropyl groups, the gum having a Williams plasticity of at least 100 mm/100 at 25° C., (2) a reinforcing silica filler, (3) a copolymer of $R_3SiO_{0.5}$ units and $SiO_2$ units wherein each R represents a monovalent hydrocarbon group having less than 7 carbon atoms and the ratio of $R_3SiO_{0.5}$ units to $SiO_2$ units is in the range from 0.5:1 to 1.2:1, (4) mica and (5) an organic peroxide curing agent.

Component (1) of the compositions of this invention is a polydiorganosiloxane gum wherein at least 50 percent of the total organic substituents bonded to silicon atoms are methyl groups. Any other organic substituents present in the polydiorganosiloxane are selected from vinyl groups, phenyl groups and trifluoropropyl groups. When present, the vinyl groups should comprise no more than 2.5 percent of the total number of silicon-bonded substituents. Generally preferred as the polydiorganosiloxanes (1) are those wherein the organic substituents are methyl and vinyl or methyl, phenyl and vinyl, and where the vinyl groups constitute less than 0.5 percent of the total siliconbonded organic substituents. Examples of such preferred polydiorganosiloxanes (1) are copolymers of dimethylsiloxane units and methylvinylsiloxane units, copolymers of dimethylsiloxane units, methylvinylsiloxane units and methylphenylsiloxane units and copolymers of dimethylsiloxane units, methylvinylsiloxane units and methylphenylvinylsiloxane units.

The gum should have a plasticity of at least 100 mm/100 as measured by the Williams plastimeter, the preferred gums being those having a plasticity within the range from about 125 to about 185 mm/100.

Component (2) is a reinforcing silica filler. Such fillers are characterised by a fine particle size and a high surface area to weight ratio, generally within the range from about 50 square meters per gram to more than 300 square metres per gram. Silicas of this type are commercially available products and are well known in the art of silicone rubber manufacture. They can be prepared pyrogenically (the so-called fume silicas) or by wet processes (precipitated silicas) and may be treated or untreated. The chemical nature and method of preparation are not significant for the purpose of this invention provided the silica is capable of providing a reinforcing (strengthening) action in the finished elastomer. The proportion of component (2) employed in the compositions of this invention is not narrowly critical and may vary from about 5 to about 75 parts, preferably from 10 to 65 parts by weight, per 100 parts by weight of polydiorganosiloxane (1).

As component (3) of the compositions of this invention there are employed copolymers of $R_3SiO_{0.5}$ and $SiO_2$ units wherein each R represents a monovalent hydrocarbon group having less than 7 carbon atoms, for example methyl, ethyl, vinyl and phenyl. The ratio of $R_3SiO_{0.5}$ to $SiO_2$ groups in the resin copolymer may lie in the range from 0.5 to 1.2. Preferred are copolymers wherein the R groups are both methyl and vinyl, and in which the ratio of $R_3SiO_{0.5}$ to $SiO_2$ is from 0.6:1 to 0.9:1. The copolymers (3) and their methods of preparation are well known in the art. They are solid or liquid, solvent-soluble products and may be prepared as described in, for example, British Patent Specification 706 719. According to the said preparative process a silica hydrosol is treated at low pH with a source of $R_3SiO_{0.5}$ siloxane units, such as a hexaorganodisiloxane e.g. $Me_3SiOSiMe_3$, $ViMe_2SiOSiMe_2Vi$ or $PhMe_2SiOSiMe_2Ph$, or a triorganochlorosilane e.g. $Me_3SiCl$, Me, Vi and Ph representing methyl, vinyl and phenyl respectively. An alternative procedure involves the cohydrolysis of the triorgano-subsituted silanes and silanes free of organic substituents. Depending on the method of preparation and the degree of molecular condensation the copolymer may have up to about 5 percent by weight of silicon-bonded hydroxyl groups. If desired the hydroxyl content may be reduced by further condensation or by reaction with a silylating agent, for example a silazane such as hexamethyldisilazane or 1,3-divinyltetramethyldisilazane or 1,3-divinyltetramethyldisilazane.

The copolymer (3) is preferably incorporated into the compositions of this invention in a proportion of at least 20 and up to 70 parts by weight, preferably from 25 to 50 parts, per 100 parts by weight of the polydiorganosiloxane (1).

The particle size of the mica which comprises component (4) of the compositions of this invention is not narrowly critical provided it is sufficiently small to permit even dispersion in the components of the composition. Mica in the form of ground mica or mica flour is suitable. The proportion of mica which is incorporated into the compositions will depend on the properties desired in the cured elastomer. At least 40 parts by weight of mica per 100 parts by weight of polydiorganosiloxane (1) should be incorporated into the compositions to obtain a significant improvement in the integrity of the insulation under fire conditions. Proportions in excess of about 220 parts by weight of mica per 100 parts of (1) give rise to difficulties in processing and to inferior mechanical properties in the cured elastomer. A preferred composition is that wherein the mica is present in a proportion of from 85 to 150 parts by weight per 100 parts by weight of (1).

The organic peroxide component (5) may be any of those which function as vulcanising agents for silicone elastomer-forming compositions. Thus, any of the peroxide or per-ester compounds known for use with silicone elastomers, for example di-t-butyl peroxide, benzoyl peroxide, tert-butyl peracetate, dicumyl peroxide and 2,5-dimethylhexane 2,5-diperbenzoate. The choice of peroxide will in practice depend on the method employed to cure the elastomer. For most applications, particularly when the insulation is applied by extrusion, as in cable and wire fabrication, there will be used a peroxide which is effective in the absence of applied pressure, e.g. monochlorobenzoyl peroxide or dichlorobenzoyl peroxide. The organic peroxide component is employed in proportions which are conventional for the vulcanisation of silicone rubbers that is from about 0.2 to about 7.5 parts by weight per 100 parts by weight of polydiorganosiloxane (1).

In addition to the components hereinabove specified the compositions of this invention may contain other ingredients which are conventional in the silicone rubber art or which may be desirable to impart certain additional properties. For example there may be included in the compositions additives for reducing or preventing the formation of structure e.g. silanols, siloxanols or silazanes, heat stability additives e.g. cerium hydroxide or iron oxide, additional extending fillers e.g. ground quartz, and pigments.

The compositions of this invention can be prepared by conventional rubber compounding techniques. For example the components may be mixed on a compounding mill or in a doughmixer. The procedure may, however, be facilitated by mixing the copolymer (3) and the mica (4) prior to incorporation with the remaining components. If desired, the formation of the pre-mix of (3) and (4) can itself be facilitated by employing the copolymer as a mixture with a polydiorganosiloxane liquid (6). Such polydiorganosiloxanes are known and commercially employed substances. They may be described as linear or substantially linear organosiloxane polymers, that is they are composed predominantly of diorganosiloxane units. Such polydiorganosiloxanes therefore include those which can be represented by the general formula $R'_n SiO_{4-n/2}$, wherein at least 60 percent of the R' groups are methyl, any remaining R' groups being selected from phenyl and vinyl, and n has a value of about 2, preferably from about 1.9 to about 2.1. The polydiorganosiloxane (6) may be end-stopped with, for example, -OX groups wherein X is H, alkyl or alkoxyalkyl, or with triorganosiloxy groups e.g. trimethylsiloxy, vinyldimethylsiloxy or phenylmethylvinylsiloxy. The existence or nature of the end-stopping groups is, however, not critical. The preferred polydiorganosiloxanes (6) are those wherein the silicon-bonded substituents are methyl with or without the presence of up to 5 percent of the total of phenyl groups and/or vinyl groups. Examples of the prefered polydiorganosiloxane liquids are polydimethylsiloxanes, copolymers of dimethylsiloxane units and dimethylvinylsiloxane units or phenylmethylvinylsiloxane units and copolymers of dimethylsiloxane units and methylvinylsiloxane units.

The polydiorganosiloxane liquid (6) may have a viscosity within the range from about 0.2 to 100 Pa.s at 25° C., viscosities in the range from 0.5 to 50 Pa.s at 25° C. being generally preferred.

The compositions of this invention may be converted to elastomers by conventional peroxide-curing techniques, for example by hot air vulcanisation or by moulding under heat and pressure. They may be applied to electrical equipment to provide thereon fire resistant insulation which substantially retains its shape even after combustion. The compositions are particularly suitable for the manufacture of fire-resistant insulated conductors such as cables and wires to which they may be applied by extrusion or any other desired technique.

The following examples, in which the parts are expressed by weight, illustrates the invention

EXAMPLE 1

46 parts of a copolymer of $Me_3SiO_{0.5}$, $Me_2ViSiO_{0.5}$ and $SiO_2$ units, in which the ratio of total triorganosiloxane units to $SiO_2$ units was about 0.8:1, was mixed with 54 parts of a dimethylvinylsiloxy-terminated copolymer of dimethylsiloxane units and methylvinylsiloxane units having a viscosity of 0.4 Pa.s at 25° C. To this mixture was added, with thorough mixing, 175 parts of finely ground mica (SX 300 supplied by Microfine Minerals and Chemicals Limited).

A siloxane elastomer-forming base stock was prepared by mixing together on a rubber compounding (2 roll) mill (A) 100 parts of a copolymer of 99.85 mol % of dimethylsiloxane units and 0.15 mol % of methylvinylsiloxane units, end-stopped with dimethylvinylsiloxane units (plasticity approximately 175 mm/100), (B) 53 parts of a reinforcing fume silica having a surface area to weight ratio of about 250 $m^2/g$, and (C) 7 parts of a low molecular weight hydroxylated polydimethylsiloxane. Fifty parts of this base stock was then intimately mixed with 50 parts of the copolymer/mica masterbatch prepared as described above and 1 part of 2,4-dichlorobenzoyl peroxide.

The elastomer-forming composition thus obtained was extruded as a rod of diameter 6.5 mm into a hot air vulcanising tunnel at 250° C., the residence time of the rod in the tunnel being 3 minutes. A portion of the rod was then placed in a furnace at about 900°- 1000° C. for 3 hours. It was converted from an elastomer to a dense, hard solid.

EXAMPLE 2

The procedure of Example 1 was repeated except that the amount of the reinforcing silica component was increased to 68 parts.

An elastomer was obtained which was converted to a dense hard solid when heated to 900° C. for 3 hours.

That which is claimed is:

1. A composition curable to an elastomer and which comprises (1) a polydiorganosiloxane gum wherein at least 50 percent of the total organic substituents are methyl groups, up to 2.5 percent of the total substituents are vinyl groups and any remaining substituents are selected from phenyl and 3,3,3-trifluoropropyl groups, the gum having a Williams plasticity of at least 100 mm/100 at 25° C., (2) a reinforcing silica filler, (3) a copolymer of $R_3SiO_{0.5}$ units and $SiO_2$ units wherein each R represents a monovalent hydrocarbon group having less than 7 carbon atoms and the ratio of $R_3SiO_{0.5}$ units to $SiO_2$ units is in the range from 0.5:1 to 1.2:1, (4) mica and (5) an organic peroxide curing agent.

2. A composition as claimed in claim 1 wherein the silicon-bonded organic substituents in polydiorganosiloxane (1) are methyl, vinyl and optionally phenyl groups, the vinyl groups being present in an amount of from 0.01 to 0.5 percent of the total substituents.

3. A composition as claimed in claim 2 wherein the polydiorganosiloxane gum (1) has a Williams plasticity in the range from 125 to 185 mm/100.

4. A composition as claimed in claim 3 wherein there is additionally present a polydiorganosiloxane liquid (6) having a viscosity in the range from 0.5 to 50 Pa.s at 25° C.

5. The product obtained by the process of curing the composition of claim 1.

6. An insulated electrical conductor wherein at least a part of the insulation consists of the cured product of the composition claimed in claim 1.

* * * * *